United States Patent [19]
Brown et al.

[11] 3,842,565
[45] Oct. 22, 1974

[54] RESILIENT BUFFER ASSEMBLY

[75] Inventors: Martin M. Brown, Birmingham; Lawrence Krawczak, Detroit, both of Mich.

[73] Assignee: Robin Products Company, Warren, Mich.

[22] Filed: May 21, 1973

[21] Appl. No.: 362,638

[52] U.S. Cl. ............... 52/716, 16/86 R, 24/73 PM, 248/345.1, 293/1, 293/62, 293/65, 293/71 R
[51] Int. Cl. ...... B60r 19/08, E04c 2/44, E04f 19/02
[58] Field of Search...... 16/86, 86 R; 24/73, 73 PM; 52/716, 717, 718; 248/188.8, 345.1; 293/1, 64, 65, 66, 67, 70, 71 R, 62

[56] References Cited
UNITED STATES PATENTS

| | | | |
|---|---|---|---|
| 1,915,249 | 6/1933 | Jorgensen | 248/345.1 |
| 1,936,113 | 11/1933 | Jelliffe | 248/188.8 |
| 1,978,249 | 10/1934 | Decarie | 16/86 |
| 2,030,255 | 2/1936 | Howard | 293/71 R X |
| 2,118,746 | 5/1938 | Tinnerman | 52/718 X |
| 2,128,656 | 8/1938 | Long | 293/66 |
| 2,585,438 | 2/1952 | Clingman | 16/86 |
| 3,122,804 | 3/1964 | Stawinski | 24/73 |
| 3,251,103 | 5/1966 | Saut | 24/73 PM |
| 3,310,929 | 3/1967 | Garvey | 52/517 X |
| 3,563,595 | 2/1971 | Slavney | 293/71 R X |
| 3,645,575 | 2/1972 | Slavney | 273/71 R X |

FOREIGN PATENTS OR APPLICATIONS

| | | | |
|---|---|---|---|
| 69,140 | 4/1958 | France | 293/65 |
| 698,212 | 11/1965 | Italy | 293/64 |
| 1,020,698 | 2/1966 | Great Britain | 293/65 |

*Primary Examiner*—M. Henson Wood, Jr.
*Assistant Examiner*—Howard Beltran

[57] ABSTRACT

A resilient trim or molding having integral tubular connectors. The tubular connectors have parallel side walls and concave end walls integral with the side walls. The side walls have camming projections which resiliently collapse the concave end walls inwardly upon receipt of the connector in the supporting panel openings. And, the camming projections have locking faces overlying the molding to secure the connector within the panel opening. The panel, which in the disclosed embodiment is an automotive bumper, includes a plurality of rectangular openings which receive the connectors, including a locator hole. The locator hole has a length and width which closely conforms to the external configuration of the connector to locate the trim on the support and the remaining holes have a greater length to accommodate tolerances and permit securement of the trim on a curved surface. The trim member is secured by first aligning the trim with a connector opposite the locator hole, biasing the connector into the locator hole to resiliently collapse the concave side walls and lock the connector within the locator hole and finally the remaining connectors are secured within the remaining panel openings.

13 Claims, 7 Drawing Figures

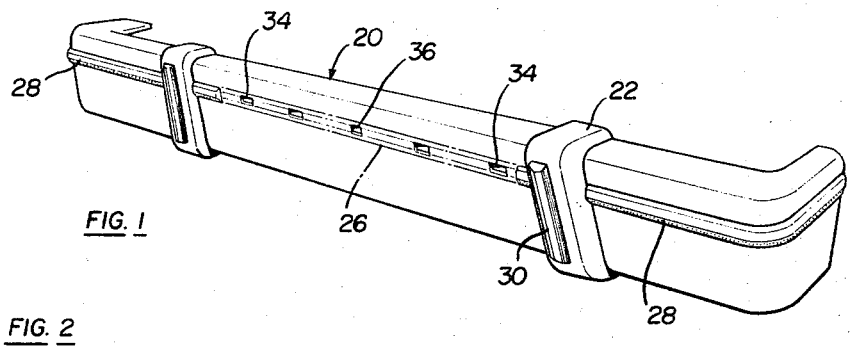
FIG. 1
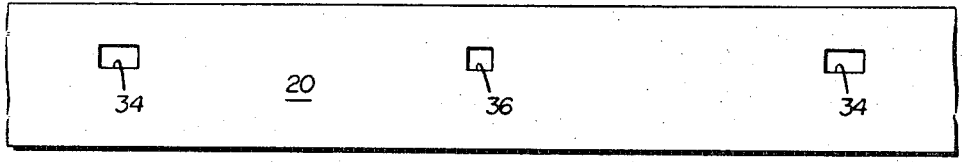
FIG. 2
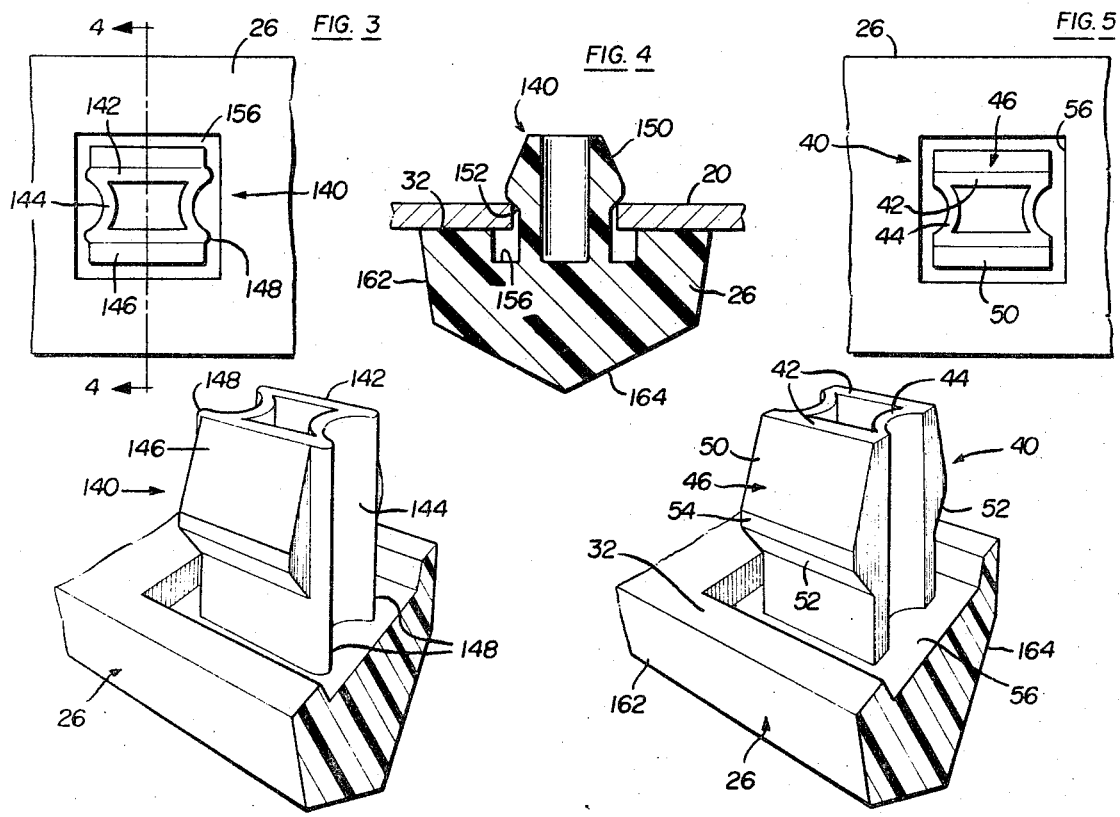
FIG. 3   FIG. 4   FIG. 5
FIG. 6   FIG. 7

RESILIENT BUFFER ASSEMBLY

RELATED APPLICATIONS

The disclosed resilient molding, assembly and method of this invention is an improvement over the trim assembly and method disclosed in our copending application for U.S. Pat., Ser. No. 290,978, filed Sept. 21, 1972, now

FIELD OF THE INVENTION

The disclosed invention relates to resilient moldings and the like, particularly suitable for protecting vehicle bumpers and panels from normal wear and damage. The resilient molding and method of this invention may also be used in other applications, such as appliances and the like.

DESCRIPTION OF THE PRIOR ART

The trim assembly of this invention eliminates the requirement of a separate adapter or clip which is utilized in the conventional automotive molding assemblies disclosed by the prior art. The adapter or clip of the prior art molding assembly is first received on a headed fastener and the molding or trim strip is then snapped or telescopically received over the adapter or clip. The adapter or clip may also be received within the trim strip, prior to assembly, and the molding is then snapped or otherwise secured to the headed fasteners, interconnecting the adapters or clips to the fasteners.

A resilient trim assembly serves two primary functions. The trim strip may be utilized for decorative purposes in automative or appliance applications and the projecting trim strip also serves to protect the supporting surface. The more conventional metal moldings and trim strips also provide these advantages, however the protection provided by a metal trim strip is minimal and the trim is easily damaged. More recently, metal trim strips have been provided with plastic inserts, however these structures are relatively expensive and still result in a metal-to-metal contact between the metal trim strip and the body panel of an automobile, for example. The trim strip of this invention provides greater protection for the supporting surface and is not easily damaged. Further, the trim strip of this invention eliminates the metal-to-metal contact, because the trim strip itself is preferably plastic or polymeric.

SUMMARY OF THE INVENTION

The trim or molding of this invention is preferably formed of a resilient polymeric material and is adapted to be secured to a supporting panel in overlying relation to protect the surface of the panel and may be utilized as a decorative trim strip in automotive applications and the like. The trim member includes at least one integral hollow tubular connector projecting from the base of the trim member and adapted to be lockingly received in a configured aperture in the panel support. The tubular connector has parallel side walls generally parallel to the longitudinal axis of the trim member and concave end walls integral with the side walls. The side walls preferably include camming projections which resiliently collapse the concave end walls inwardly upon insertion of the connector into the panel opening. Each of the camming projections have a camming face inclined outwardly from adjacent the distal end of the connector and a locking face overlying the trim member. Upon insertion of the connector into a panel opening, the camming face of the connector is biased against the side walls of the panel opening, resiliently collapsing the concave walls inwardly, permitting the connector to be received within the panel opening and engaging the locking faces against the opposed edges of the panel opening, securely retaining the trim member to the panel support.

The trim member in the disclosed embodiment includes a number of tubular connectors extending from the base of the strip and the panel includes an equal number of rectangular openings receiving the connectors. At least one of the panel openings in the preferred embodiment is configured to closely conform to the external dimensions of the tubular connectors, providing a locator hole for the trim strip and, in the disclosed embodiment, a special connector is provided for receipt in the locator hole. The special connector includes resilient side edges which resiliently grip the edges of the panel opening.

The method of securing the resilient trim strip of this invention then includes generally aligning the trim strip adjacent the panel with one connector opposite the locator hole, inserting a connector in the locator hole and, finally, inserting the remaining connectors in the remaining panel apertures. In the preferred embodiment, the camming faces of the connectors resiliently collapse the concave side walls as the connectors are inserted into the panel apertures, as described above, and a special connector is provided for the locator hole.

It will be understood that the molding, assembly and method of this invention may be utilized in various applications, including but not limited to trim strips and moldings for automotive applications and appliances. The instant application will be described in the context of an automotive trim assembly, and more particularly a bumper guard, to simplify the description.

Other advantages and meritorious features of this invention will more fully appear from the following description of the preferred embodiments, claims and accompanying drawings.

BRIEF DESCRIPTION OF THE DRAWINGS

FIG. 1 is a perspective side view of a vehicle bumper including the resilient trim assembly of this invention;

FIG. 2 is a partial side view of the panel apertures shown in the bumper of FIG. 1;

FIG. 3 is a bottom view of one of the connectors utilized in the resilient molding of this invention;

FIG. 4 is an end cross-sectional view of the connector shown in FIG. 3, in the direction of view arrows 3—3;

FIG. 5 is a bottom view of another connector utilized in the resilient molding of this invention;

FIG. 6 is a bottom perspective view of the connector shown in FIGS. 3 and 4; and FIG. 7 is a bottom perspective view of the resilient connector shown in FIG. 5.

DESCRIPTION OF THE PREFERRED EMBODIMENTS

FIG. 1 illustrates a suitable application for the resilient molding or trim and trim assembly of this invention. FIG. 1 shows a typical automotive bumper 20 having a pair of generally vertical bumper guards 22 secured to the bumper in spaced relation. The bumper assembly includes three separate embodiments of the improved resilient molding, including a central molding 26, end moldings 28 and bumper guard moldings 30. The resilient moldings are secured to the bumper guards in overlying relation and serve to protect the bumper from wear and scratches, especially when the bumper is contacted by another vehicle or obstruction. The molding assembly of this invention includes a supporting panel, such as the bumper 20, a plurality of rectangular apertures 34 and 36, as shown in FIGS. 1 and 2 and a resilient trim member such as shown at 26, 28 and 30. The trim member 26 is disclosed in detail in FIGS. 3 and 7 as an illustration of one embodiment of the invention.

The disclosed embodiment of the trim strip 26 has a channel-shaped exterior, similar to the conventional rolled metal channels, and a base portion 32 which overlies the bumper panel 20, as shown in FIG. 4. The preferred embodiment of the molding of this invention has a plurality of integral tubular connectors 40 as best shown in FIGS. 5 and 7. The tubular connectors each include a pair of generally parallel side walls 42, concave end walls 44 integral with the side walls and camming projections or detents 46 integral with the side walls.

The camming detents each include a camming face 50 inclined outwardly from the distal end of the connector, an inclined locking face 52 overlying the base 32 of the molding, as shown in FIG. 7. In the disclosed embodiment, the triangular detent is truncated to define a shoulder 54. The preferred embodiment of the molding also includes a chamfer or channel 56 in the base 32 of the molding, surrounding the detent, as shown in FIG. 7.

The tubular connector 140 shown in FIGS. 3, 4 and 6 is substantially identical to the connector shown in FIGS. 5 and 7 and has been numbered in the same sequence. The tubular connector 140 includes parallel side walls 142, concave end walls 144 and camming detents 146. In the embodiment shown in FIGS. 3, 4 and 6, however, the detent does not extend the entire length of the parallel side walls, as best shown in FIGS. 3 and 6, but is spaced from the arcuate side edges 148 of the tubular connector. The advantages of the disclosed embodiments and the preferred applications will be described hereinbelow.

In the preferred embodiment of the molding assembly, the panel includes a plurality of rectangular apertures or holes 34 and one locator hole 36, as shown in FIGS. 1 and 2. The locator hole 36 has a configuration which closely conforms to the external configuration of the tubular connectors to locate the molding on the support. It will be noted that the external configuration of the disclosed connectors is substantially square, as shown in FIGS. 3 and 5, and therefore the locator hole 36 is also square. Further, in the disclosed embodiment, a special connector 140 is provided for the locator hole which securely locks the molding in position. The locator connector 140 includes the arcuate corners or edges 148 which resiliently contact the edges of the locator aperture 36 to fix the position of the molding on the support. The remaining details of the connectors 40 and 140 may be identical.

The connectors disclosed in our prior application were eliptical in cross-section, with parallel side walls. As the connectors were inserted in the panel apertures, the concave ends bowed outwardly, requiring a relatively large hole in the panel. Further, the side walls of the connectors would tend to collapse, reducing the retention capabilities of the connectors.

In the preferred embodiment of this disclosure, the end walls 44 and 144 of the connectors 40 and 140 are concave, such that the side walls 42 and 142 remain parallel to the sides of the panel openings as the connector is inserted in the panel opening and the concave walls collapse inwardly. The preferred embodiment of this invention therefore may be inserted into a smaller panel aperture, permitting the use of a locator hole 36, as shown in FIG. 2.

As the connector 40 or 140 is inserted into a panel opening, the inclined camming face 50 or 150 first engages the sides of the panel aperture, resiliently collapsing the concave end walls 40 or 144, permitting receipt of the connector within the panel opening. The inclined locking face 52 then engages the opposed edges of the panel aperture, as shown in FIG. 4. The locking face 52 or 152 has a greater angle of inclination than the camming face 50 or 150, defining a locking angle. In a normal operation, the bumper stock varies from 0.096 to 0.106 and the chamfer 56 or 156 accommodates the tolerances in the metal stock.

It will be understood that the preferred material for the resilient trim strip will depend upon the particular application. The integral connectors must be sufficiently resilient to permit receipt of the connectors within the panel apertures 34 and 36 and the channel-shaped strip is preferably flexible to prevent undo damage due to impact. In the particular application shown in FIG. 1, the resilient trim must be able to withstand high impact loading and provide fast recovery after impact. A suitable material for the application shown in FIG. 1 is a high impact polyethylene sold by E. I. DuPont de Nemours and Co. under the trade name "Surlyn."

As described above, the external configuration of the molding will depend upon the particular applicatiom. In the disclosed embodiment, the molding includes inclined side walls 162 adjacent the base 32 of the molding and inclined end walls 164.

As described above, the method of securing the molding strip 26 includes locating the molding adjacent the support panel 20 with the locator connector 140 opposite the locator hole 36. The locator connector 140 is then inserted into the hole 36 by biasing the camming face 150 against the opening 36, resiliently collapsing the concave end walls 144 and receiving the connector within the opening, as shown in FIG. 4. In this position, the locking faces 152 engage the opposed edges of the panel 20, securely retaining the connector within the panel opening 36. As described above, the locator connector 140 also includes resilient arcuate edges 148 which engage the opposed edges of the panel, accurate locating the molding on the support. Finally, the remaining connectors 40 are inserted into the remaining panel openings 34 by biasing the inclined camming faces 46 against the panel openings, receiving the connectors within the openings and locking the connectors in place.

The molding 26 in the disclosed embodiment includes four rectangular panel openings 34 and one locator hole. The rectangular panel openings 34 are longer, as shown by dimension $b$, than the length of the locator hole *a*. The longer apertures accommodate tolerance variations in the distance between the connectors and the panel apertures and also permit the molding to be readily attached to a curved or angled surface. The moldings 28 are secured around the curved ends of the bumper and are molded to the desired configuration. Each of the moldings 28 include a plurality of tubular connectors 40 and one locator connector 140. In the particular disclosed embodiment, the locator hole and connector is preferably near the end of the bumper. The moldings 30 on the bumper guards 22 may include only one connector, however the preferred embodiment includes two connectors, as disclosed in our above referenced copeninding application for United States patent.

We claim:

1. A trim and panel assembly, comprising, in combination, a panel support having a predetermined thickness, a rectangular aperture in said panel, a resilient polymeric trim member having a base overlying one face of said panel and an integral hollow tubular connector disposed within said aperture and retaining said trim member to said panel, said connector having generally parallel side walls, parallel to the side edges of said rectangular aperture and inwardly concave end walls integral with said side walls, and locking projections on each of said side walls, each of said locking projections having a camming face inclined outwardly from the distal end of said connector and a locking face overlying said trim member, said locking face engaging said side edges of the aperture on the opposed face of said panel, said concave walls of said hollow tubular connector sufficiently resilient to resiliently collapse inwardly upon biasing inwardly of said locking projections, whereby said camming faces of said hollow connector engage the opposed side edges of said aperture, resiliently collapsing said concave walls inwardly to receive said locking faces against the opposed edges of said aperture, retaining said trim member to said panel.

2. The trim and panel assembly defined in claim 1, characterized in that said trim member is an elongated strip having a longitudinal axis and said trim member includes a plurality of said hollow tubular connectors, each connector received in a rectangular panel aperture.

3. The trim and panel assembly defined in claim 2, characterized in said rectangular apertures having a length substantially equal to the length of said parallel side walls of said connectors and at least one of said apertures having a substantially greater length to accommodate variations in spacing between the apertures and connectors.

4. The trim and panel assembly defined in claim 2, characterized in that one of said connectors has resilient side edges, wherein said side walls project beyond said camming projections, on opposed sides, and arcuately blend with said concave walls to provide said resilient side edges.

5. A resilient, polymeric self-retaining trim member having a base adapted to be secured to a support, in overlying relation, said trim member having an integral hollow tubular connector projecting from said base and adapted to be lockingly received in a generally rectangular aperture in said support, said tubular connector having parallel side walls generally parallel to the longitudinal axis of said trim member and relatively resilient, inwardly concave end walls integral with said side walls and within the projection of said side walls, and camming projections on said side walls, each of said camming projections having a camming face inclined outwardly from adjacent the distal end of said connector and a locking face overlying the base of said trim member, said camming projections resiliently biasing said side walls inwardly, in generally parallel relation about their junction with said base, collpasing said concave end walls inwardly, within the projection of said side walls, upon receipt of said connector in said panel aperture.

6. The trim member defined in claim 5, wherein said trim member base is closed and said tubular connector is open at its distal end.

7. The trim member defined in claim 6, wherein said trim member is channel-shaped having a base and opposed side walls, said tubular connector integrally joined to said base wall and extending beyond said side walls of said trim member.

8. A resilient elongated polymeric trim member comprising a channel-shaped section having a longitudinal base portion and opposed longitudinal side walls, a plurality of integral tubular connectors joined to said base portion and extending beyond said side walls, said connectors each having opposed side walls generally parallel to the longitudinal axis of said channel section and opposed relatively resilient end walls concave inwardly toward the axis of said tubular connectors, and said connector side walls having camming faces inclined outwardly from adjacent the distal end of said connectors, toward said channel side walls, and locking faces overlying said channel section base portion, said camming faces resiliently biasing the connector side walls inwardly about the junction with said base portion, toward the axis of said connectors and resiliently collapsing said concave end walls within the projection of said connector side walls upon securement of the trim member, permitting receipt of the connectors within an opening having a length equal to the length of said connector side walls.

9. The trim member defined in claim 8, wherein said channel section is closed and continuous and said tubular connectors are opened at their distal ends.

10. The trim member defined in claim 8, wherein said connector concave end walls are arcuate and symmetric to the axis of said connectors.

11. A trim and panel assembly comprising, in combination, a panel having a plurality of spaced apertures of substantially equal dimension having opposed parallel side edges and a locator aperture having parallel side edges shorter in length than the side edges of said plurality of apertures, an elongated resilient trim member overlying said panel and said panel apertures, said trim member having a plurality of projecting integral tubular connectors each secured in one of said panel apertures, said connectors each having opposed parallel side walls engaging said side edges of said panel apertures in securing relation, the length of said connector side walls being equal to the length of said locator aperture side edges, each of said connectors having opposed, relatively resilient end walls, concave inwardly toward the axis of said connectors and within the projection of said side walls, and said side walls having camming faces inclined outwardly toward said trim member, said camming faces resiliently biasing said side walls inwardly in generally parallel relation to receive the connectors within said panel apertures in locking relation and resiliently collapsing said concave end walls inwardly, permitting receipt of one connector within said locator aperture.

12. The trim and panel assembly defined in claim 11, wherein said trim member is channel-shaped, having a closed continuous bottom wall and opposed longitudinal side walls engaging one face of said panel, said tubular connectors integrally joined to said base wall and extending beyond said channel side walls, and said connectors open at their distal ends.

13. The trim and panel assembly defined in claim 11, wherein said concave end walls of said connectors are arcuate and symmetric about the axis of said connectors.

* * * * *